United States Patent
Zhou et al.

(10) Patent No.: US 6,456,409 B2
(45) Date of Patent: Sep. 24, 2002

(54) METHOD AND APPARATUS FOR EXTENDING FIBER TRANSMISSION DISTANCE WITH MULTIPLE PRE-EMPHASES IN OPTICALLY AMPLIFIED DWDM SYSTEM

(75) Inventors: Jianying Zhou, Acton, MA (US); Richard A. Barry, Brookline, MA (US); Murat Azizoglu, North Billerica, MA (US); Eric A. Swanson, Acton, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 0 days.

(21) Appl. No.: 09/906,195

(22) Filed: Jul. 16, 2001

Related U.S. Application Data

(60) Provisional application No. 60/219,830, filed on Jul. 21, 2000, and provisional application No. 60/261,564, filed on Jan. 12, 2001.

(51) Int. Cl.[7] .......................... H04J 14/02; H04B 10/00
(52) U.S. Cl. ........................................ 359/124; 359/161
(58) Field of Search ............................... 359/110, 124, 359/133, 127, 161, 177, 188

(56) References Cited

U.S. PATENT DOCUMENTS

| | | | | |
|---|---|---|---|---|
| 4,945,531 A | * | 7/1990 | Suzuki | 370/3 |
| 5,790,289 A | | 8/1998 | Taga et al. | 359/124 |
| 5,877,879 A | * | 3/1999 | Naito | 359/133 |
| 5,914,794 A | * | 6/1999 | Fee et al. | 359/110 |
| 5,915,025 A | | 6/1999 | Ball | 385/24 |
| 5,953,139 A | | 9/1999 | Nemecek et al. | 359/124 |
| 6,040,933 A | | 3/2000 | Khaleghi et al. | 359/124 |
| 6,115,157 A | | 9/2000 | Barnard et al. | 359/124 |
| 6,157,475 A | | 12/2000 | Dugan et al. | 359/110 |
| 6,185,022 B1 | * | 2/2001 | Harasawa | 359/124 |
| 6,212,229 B1 | | 4/2001 | Salinger | 375/224 |
| 6,233,077 B1 | | 5/2001 | Alexander et al. | 359/133 |
| 6,292,289 B1 | * | 9/2001 | Sugaya et al. | 359/337 |
| 6,323,994 B1 | * | 11/2001 | Li et al. | 359/341.1 |
| 6,339,495 B1 | * | 1/2002 | Cowle et al. | 359/341.4 |

OTHER PUBLICATIONS

Eight–channel 40 Gb/s RZ transmission over four 80 km spans (328 km) of NDSF with a net dispersion tolerance in excess of 180 ps/nm; Zhu, et al, TuD4–1, pp. 51–53.

* cited by examiner

*Primary Examiner*—Leslie Pascal
*Assistant Examiner*—Dalzid Singh
(74) *Attorney, Agent, or Firm*—Weingarten, Schurgin, Gagnebin & Lebovici LLP

(57) ABSTRACT

A Dense Wavelength Division Multiplexed (DWDM) optical transmission system that compensates for unequal channel performance over an extended fiber transmission distance. The DWDM optical transmission system includes optical transmitters at a transmitter end of a transmission path for transmitting respective channels of information at different wavelengths, a first pre-emphasis device for performing a first pre-emphasis technique on the respective channels, an optical multiplexor for combining the respective channels into a multi-wavelength optical signal for transmission on a single transmission fiber, at least one optical amplifier for amplifying the optical signal along the path, at least one second pre-emphasis device disposed along the path for performing a second pre-emphasis technique on the respective channels, an optical de-multiplexor for separating the optical signal into its component channels, and optical receivers at a receiver end of the path for receiving and detecting the information carried by the respective channels. The first and second pre-emphasis techniques performed by the respective first and second pre-emphasis devices compensate for unequal channel performance along the transmission path over a desired fiber transmission distance.

23 Claims, 6 Drawing Sheets

METHOD AND APPARATUS FOR EXTENDING FIBER TRANSMISSION DISTANCE WITH MULTIPLE PRE-EMPHASES IN OPTICALLY AMPLIFIED DWDM SYSTEM

CROSS REFERENCE TO RELATED APPLICATIONS

This application claims priority of U.S. Provisional patent application Ser. No. 60/219,830 filed Jul. 21, 2000 entitled METHOD AND APPARATUS FOR EXTENDING FIBER TRANSMISSION DISTANCE WITH MULTIPLE PRE-EMPHASES IN OPTICALLY AMPLIFIED DWDM SYSTEM.

This application claims priority of U.S. Provisional patent application Ser. No. 60/261,564 filed Jan. 12, 2001 entitled A SYSTEM AND METHOD OF POWER EQUALIZATION AND DISPERSION COMPENSATION IN FIBER OPTIC NETWORKS.

STATEMENT REGARDING FEDERALLY SPONSORED RESEARCH OR DEVELOPMENT

N/A

BACKGROUND OF THE INVENTION

The present invention relates generally to the field of optical transmission systems, and more specifically to a dense wavelength division multiplexed optical transmission system providing enhanced control of end-to-end channel performance to extend fiber transmission distance.

Dense Wavelength Division Multiplexed (DWDM) optical transmission systems have been widely deployed in optical networks to increase network speed and capacity. A conventional DWDM optical transmission system comprises a plurality of optical transmitters configured to transmit respective channels of information at different wavelengths, an optical multiplexor configured to combine the respective channels into a multi-wavelength optical signal for transmission on a single transmission fiber, a plurality of serially connected optical amplifiers configured as repeaters to amplify the multi-wavelength optical signal at intervals along a transmission path, an optical de-multiplexor configured to separate the multi-wavelength optical signal into its component channels, and a plurality of optical receivers configured to receive and detect the information carried by the respective channels.

One drawback of the conventional DWDM optical transmission system is that the optical amplifiers disposed along the transmission path typically have wavelength dependent gain and noise profiles, which can cause unequal channel performance. For example, the performance of the channels in the conventional DWDM optical transmission system may be characterized by associated Optical Signal-to-Noise Ratio (OSNR) values. Further, because of the wavelength dependent gain and noise profiles of the optical amplifiers, the OSNR values associated with the channels may not be equal to one another at the receiver end of the transmission path even though the channels may have the same optical power levels at the transmitter end of the path.

One approach to compensating for such unequal channel performance in the conventional DWDM optical transmission system is to perform a pre-emphasis technique at the transmitter end of the transmission path. For example, the OSNR values of the respective channels may be monitored at the receiver end of the transmission path by a measurement device such as an optical spectrum analyzer, and the pre-emphasis attenuation or gain of the respective channels may be adjusted by varying the optical power levels at the transmitter end of the path based on the measured OSNR values to achieve designated OSNR values at the receiver end of the path.

However, performing such pre-emphasis techniques at the transmitter end of the transmission path to compensate for unequal channel performance at the receiver end of the path has its own drawbacks. For example, pre-emphasis techniques that raise optical power levels of selected channels at the transmitter end of the transmission path may increase power levels at the optical amplifier outputs, which may in turn increase the total power requirements of the optical transmission system. Having high power levels in some channels may also introduce transmission impairment due to fiber non-linearity, especially for channel bit rates of 10 Gbit/s or more. Therefore, such pre-emphasis techniques are typically only used to compensate for unequal channel performance over a limited fiber transmission distance.

Another approach to equalizing channel performance in the conventional DWDM optical transmission system, which may be used in conjunction with the above-mentioned pre-emphasis technique, is to terminate and regenerate the multi-wavelength optical signal on the transmission path. However, this approach also has drawbacks in that such optical signal termination/regeneration typically requires optical-to-electrical and electrical-to-optical conversions, which are very costly and usually must be performed at regular intervals along the transmission path.

It would therefore be desirable to have a DWDM optical transmission system that compensates for unequal channel performance. Such a DWDM optical transmission system would be capable of compensating for unequal channel performance over an extended fiber transmission distance, thereby reducing the need for terminating and regenerating multi-wavelength optical signals on an optical transmission path.

BRIEF SUMMARY OF THE INVENTION

In accordance with the present invention, a Dense Wavelength Division Multiplexed (DWDM) optical transmission system is provided that compensates for unequal channel performance over an extended fiber transmission distance. The presently disclosed invention achieves such benefits by way of a multiple pre-emphases technique that provides enhanced control of the channel performance from a transmitter end to a receiver end of an optical transmission path.

In one embodiment, the DWDM optical transmission system includes a plurality of optical transmitters at a transmitter end of a transmission path configured to transmit respective channels of information at different wavelengths, a first pre-emphasis device configured to perform a first pre-emphasis technique on the respective channels, an optical multiplexor configured to combine the respective channels into a multi-wavelength optical signal for transmission on a single transmission fiber, at least one optical amplifier configured to amplify the multi-wavelength optical signal along the path, at least one second pre-emphasis device disposed along the path and configured to perform a second pre-emphasis technique on the respective channels, an optical de-multiplexor configured to separate the multi-wavelength optical signal into its component channels, and a plurality of optical receivers at a receiver end of the path configured to receive and detect the information carried by the respective channels.

The first pre-emphasis technique performed by the first pre-emphasis device includes measuring a first plurality of Optical Signal-to-Noise Ratio (OSNR) values of the respective channels at an output of the second pre-emphasis device, and adjusting pre-emphasis attenuation and gain of the respective channels based on the first measured OSNR values to achieve a first plurality of designated OSNR values of the respective channels at the second pre-emphasis device output. In the first pre-emphasis technique, the OSNR values of the respective channels are measured by a measurement device such as an optical spectrum analyzer.

The second pre-emphasis technique performed by the second pre-emphasis device includes measuring a second plurality of OSNR values of the respective channels at the receiver end of the transmission path, and adjusting pre-emphasis attenuation and gain of the respective channels based on the second measured OSNR values to achieve a second plurality of designated OSNR values of the respective channels at the receiver end of the path.

In the second pre-emphasis technique, the OSNR values of the respective channels are measured by one of a plurality of possible OSNR measurement techniques. Each OSNR measurement technique takes into account Amplified Spontaneous Emission (ASE) noise at the output of the second pre-emphasis device, which may have been modified by dispersion components included in the second pre-emphasis device. A first OSNR measurement technique includes measuring out-of-band ASE noise levels of the respective channels at the second pre-emphasis device output, and estimating actual ASE noise levels of the respective channels using the measured out-of-band ASE noise. A second OSNR measurement technique includes measuring in-band ASE noise levels of the respective channels at the second pre-emphasis device output by alternately turning optical signal power "on" and "off". A third OSNR measurement technique includes measuring optical signal power levels of the respective channels at the second pre-emphasis device output by dithering optical signal carriers, and estimating OSNR values at the respective channels using the measured optical signal power.

By employing a plurality of pre-emphasis devices to perform a multiple pre-emphases technique on the respective channels of information, the DWDM optical transmission system compensates for unequal channel performance while reducing the need for terminating and regenerating the multi-wavelength optical signal on the optical transmission path.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

The entire disclosure of U.S. Provisional patent application Ser. No. 60/219,830 filed Jul. 21, 2000 is incorporated herein by reference.

The entire disclosure of U.S. Provisional patent application Ser. No. 60/261,564 filed Jan. 12, 2001 is incorporated herein by reference.

A Dense Wavelength Division Multiplexed (DWDM) optical transmission system is disclosed that is capable of compensating for unequal channel performance over an extended fiber transmission distance. The presently disclosed DWDM optical transmission system achieves such compensation by performing a multiple pre-emphases technique to provide enhanced control of end-to-end channel performance.

Figure 1:
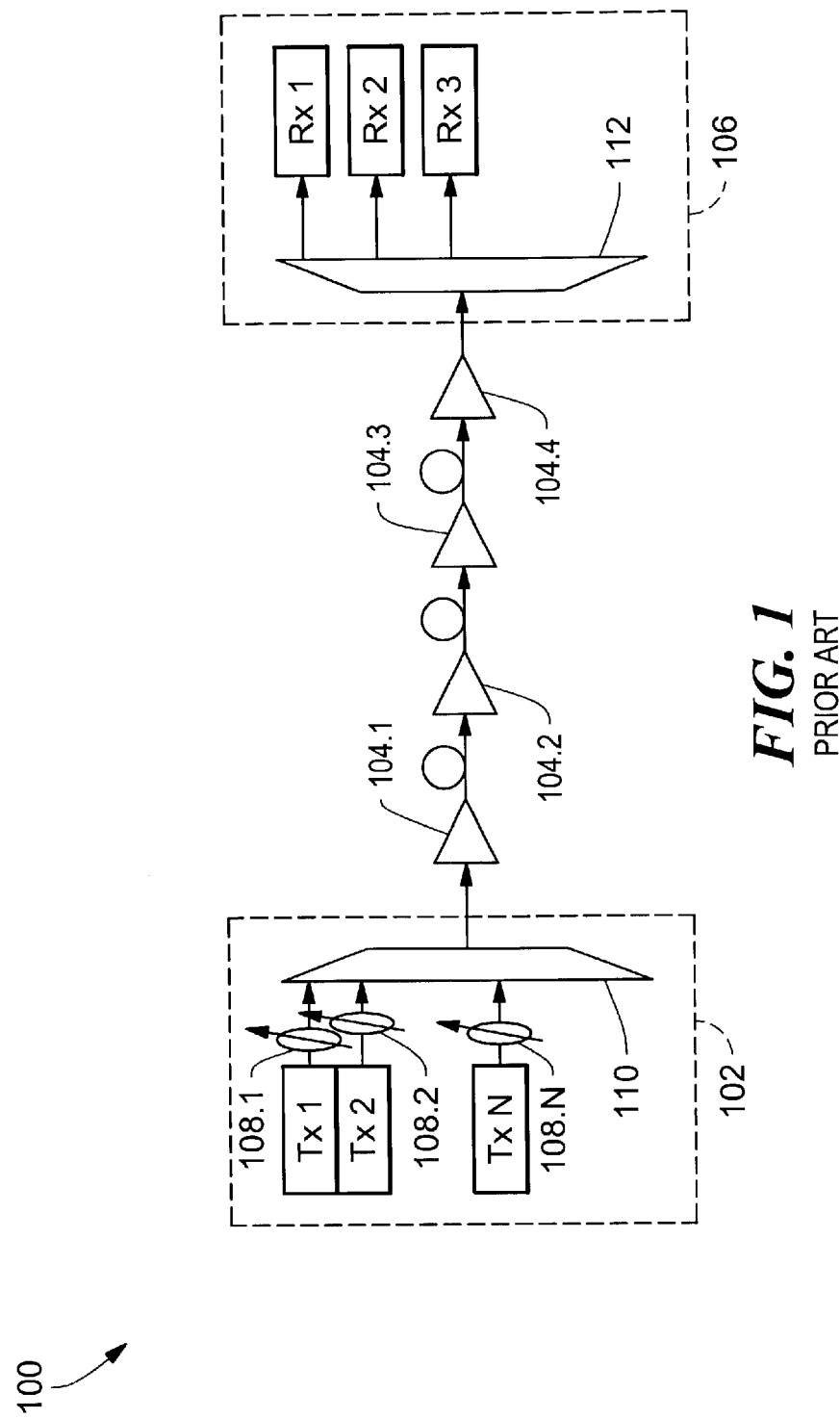
FIG. 1 is a block diagram depicting a conventional DWDM optical transmission system capable of performing a single pre-emphasis technique.

FIG. 1 depicts a block diagram of a conventional DWDM optical transmission system 100 that includes a plurality of optical amplifiers 104.1–104.4 serially coupled along a transmission path between a transmitter end 102 and a receiver end 106.

Specifically, the transmitter end 102 includes a plurality of optical transmitters Tx1–TxN configured to transmit respective channels of information, in which the respective channels are at different wavelengths $\lambda_1$–$\lambda_N$. The transmitter end 102 also includes a plurality of Variable Optical Attenuators (VOAs) 108.1–108.N configured to receive the respective channels and reduce optical power gain across at least a portion of the channels. For example, the optical transmitters Tx1–TxN may have produced non-uniform optical power gains across the channels at wavelengths near an edge of the available optical transmission spectrum. Accordingly, the VOAs 108.1–108.N receive the respective channels and reduce these non-uniform optical power gains to a uniform level.

The transmitter end 102 further includes an optical multiplexor 110 configured to receive the respective channels having uniform optical power gains and combine the respective channels into a multi-wavelength optical signal for transmission on a single transmission fiber. The optical amplifiers 104.1–104.4 are configured as repeaters to amplify the multi-wavelength optical signal at intervals along the transmission path.

The receiver end 106 includes an optical demultiplexor 112 configured to separate the multi-wavelength optical signal into its component channels, and a plurality of optical receivers Rx1–RxN configured to receive and detect the information carried by the respective channels.

Those of ordinary skill in the art will appreciate that channel performance in optically amplified DWDM transmission systems can be characterized by Optical Signal-to- Noise Ratio (OSNR) values associated with the respective channels. It is noted that OSNR is defined herein as the difference between the optical signal power and the power of corresponding Amplified Spontaneous Emission (ASE) noise within a predetermined bandwidth, e.g., 0.1 nm, of the optical signal.

The optical amplifiers 104.1–104.4 disposed along the transmission path typically have wavelength dependent gain and noise profiles that can cause unequal channel performance at the receiver end 106. In order to compensate for such unequal performance across the channels, the conventional DWDM optical transmission system 100 typically performs a single pre-emphasis technique at the transmission end 102 of the transmission path.

For example, the single pre-emphasis technique may include estimating OSNR values of the respective channels at the receiver end 106, and adjusting the pre-emphasis attenuation or gain of the respective channels by way of the VOAs 108.1–108.N based on the estimated OSNR values to achieve designated OSNR values at the receiver end 106.

Figure 2:
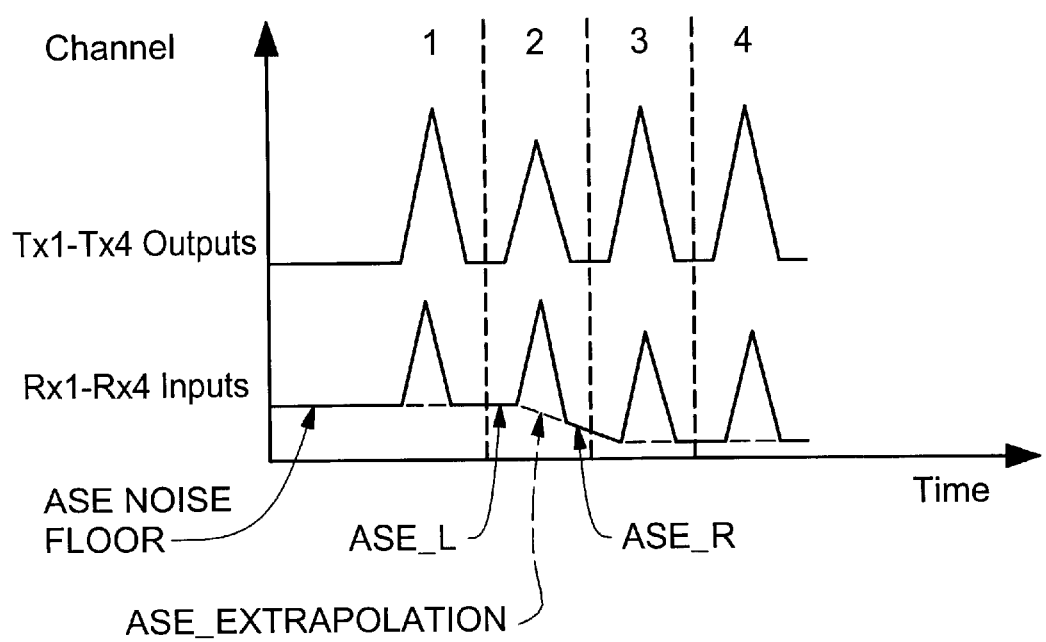
FIG. 2 is a diagram depicting exemplary optical waveforms at transmitter and receiver ends of the conventional DWDM optical transmission system of FIG. 1, the exemplary waveforms illustrating an OSNR estimation technique employing extrapolation.

FIG. 2 depicts a diagram including exemplary optical waveforms at outputs of the optical transmitters Tx1–Tx4 and at the inputs of the optical receivers Rx1–Rx4. The exemplary waveforms of FIG. 2 illustrate an OSNR estimation technique employing extrapolation, which may be used with the above-described conventional single pre-emphasis technique.

Specifically, the diagram of FIG. 2 shows the exemplary waveforms at the Tx1–Tx4 outputs having non-uniform optical power gains. For example, the optical transmitters Tx1–Tx4 may produce the non-uniform power gains across the channels 1–4. Further, the VOAs 108.1–108.4 may subsequently receive the channels 1–4 and reduce the non-uniform power gains to a uniform level. The diagram also shows the exemplary waveforms at the Rx1-Rx4 inputs. Because the optical amplifiers 104.1–104.4 may have wavelength dependent gain and noise profiles, the diagram of FIG. 2 shows a non-flat ASE noise floor across the channels 1–4 at the Rx1–Rx4 inputs.

Even though the ASE noise floor across the channels 1–4 at the receiver end 106 is non-flat, particularly across channel 2, OSNR values of the respective channels 1–4 can be estimated by way of extrapolation. These estimated OSNR values may then be used in the conventional single pre-emphasis technique to compensate for the unequal channel performance.

For example, to estimate the OSNR value of channel 2, the optical signal power level of channel 2 "Power_2" is measured. Next, the ASE noise level at a left shoulder portion "ASE_L_2" and at a right shoulder portion "ASE_R_2" of the optical signal of channel 2 are measured. The OSNR value of channel 2 "OSNR_2" is then estimated using the following equation:

$$\text{OSNR\_2} = \text{Power\_2} - 0.5*(\text{ASE\_L\_2} + \text{ASE\_R\_2}), \quad (1)$$

in which the expression "0.5*(ASE_L_2+ASE_R_2)" represents the extrapolated in-band ASE noise level of channel 2. The OSNR values of channels 1, 3, and 4 may be estimated in a similar manner.

It is noted that the single pre-emphasis technique performed by the conventional DWDM optical transmission system 100 is typically only employed to compensate for unequal channel performance over a limited fiber transmission distance.

Figure 3:
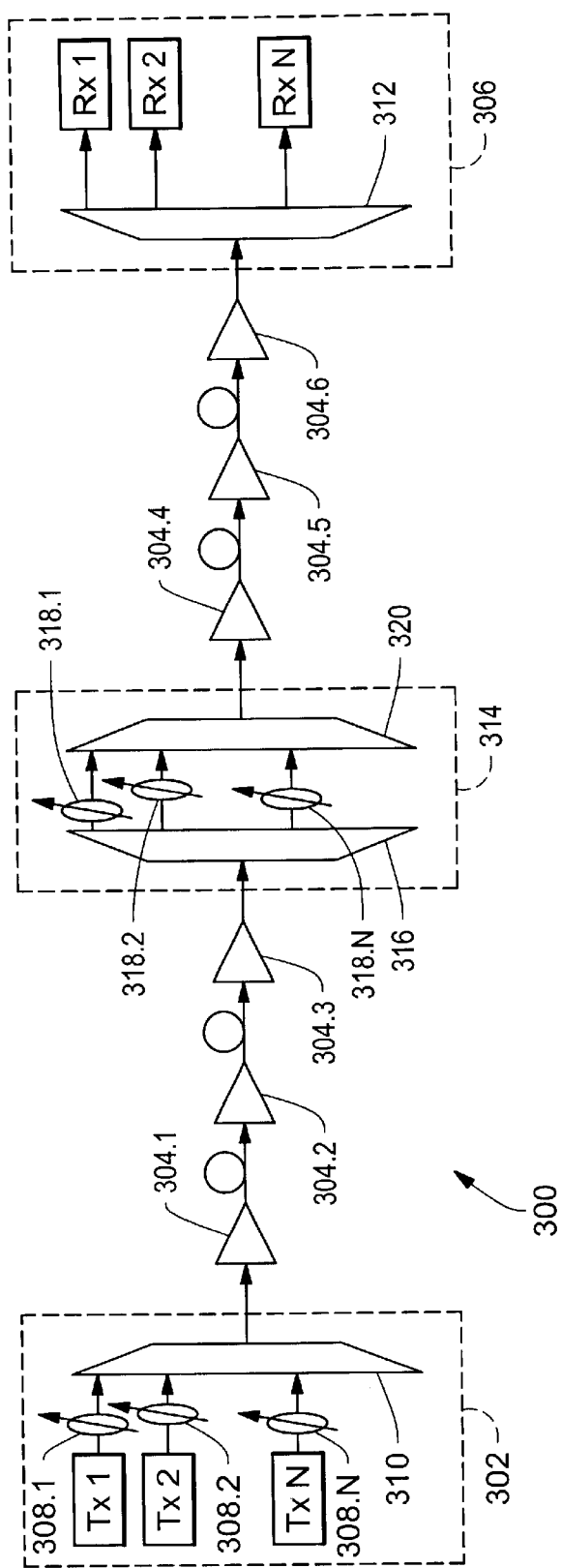
FIG. 3 is a block diagram depicting a DWDM optical transmission system capable of performing a multiple pre-emphases technique according to the present invention.

FIG. 3 depicts a block diagram of a DWDM optical transmission system 300 capable of performing a multiple pre-emphases technique, in accordance with the present invention. The multiple pre-emphases technique performed by the DWDM optical transmission system 300 may be employed to compensate for unequal channel performance over an extended fiber transmission distance.

In the illustrated embodiment, the DWDM optical transmission system 300 includes a first plurality of optical amplifiers 304.1–304.3 serially coupled along a transmission path between a transmitter end 302 and a pre-emphasis device 314, and a second plurality of optical amplifiers 304.4–304.6 serially coupled along the path between the pre-emphasis device 314 and a receiver end 306. It is noted that the DWDM optical transmission system 300 performs the multiple pre-emphases technique by performing a first pre-emphasis technique at the transmitter end 302 and a second pre-emphasis technique at the pre-emphasis device 314. Further, although the DWDM optical transmission system 300 includes the single pre-emphasis device 314, it should be understood that the system 300 may alternatively include a plurality of such pre-emphasis devices to compensate for unequal channel performance over a desired fiber transmission distance.

Specifically, the transmitter end 302 includes a plurality of optical transmitters Tx1–TxN configured to transmit respective channels 1-N of information at different wavelengths $\lambda_1-\lambda_N$, and a plurality of VOAs 308.1–308.N configured to receive the respective channels 1-N and reduce non-uniform optical power gains across the channels 1-N to a uniform level. The transmitter end 302 further includes an optical multiplexor 310 configured to receive the respective channels 1-N and combine the channels 1-N into a multi-wavelength optical signal for transmission on a single transmission fiber. The optical amplifiers 304.1–304.6 are configured as repeaters to amplify the multi-wavelength optical signal at intervals along the transmission path. For example, the optical amplifiers 304.1–304.6 may comprise respective Erbium Doped Fiber Amplifiers (EDFAs), and the single transmission fiber may comprise a single mode optical transmission fiber.

The receiver end 306 includes an optical demultiplexor 312 configured to separate the multi-wavelength optical signal into its component channels 1N, and a plurality of optical receivers Rx1–RxN configured to receive and detect the information carried by the channels 1-N.

As described above, the DWDM optical transmission system 300 includes the pre-emphasis device 314. In the illustrated embodiment, the pre-emphasis device comprises an Optical Equalization Node (OEQN) such as the OEQN apparatus described in the above-referenced U.S. Provisional patent application Ser. No. 60/261,564 filed Jan. 12, 2001. However, it should be understood that the pre-emphasis device 314 may alternatively comprise a Dynamical Gain Flatness Filter (DGFF) or any other suitable device capable of performing the multiple pre-emphases technique disclosed herein.

Specifically, the pre-emphasis device 314 includes an optical de-multiplexor 316 configured to separate the multi-wavelength optical signal provided by the optical amplifier 304.3 into its component channels 1-N, a plurality of VOAs configured to reduce non-uniform optical power gains across the channels 1-N, and an optical multiplexor 320 configured to combine the channels 1-N back into a multi-wavelength optical signal for further transmission on the single transmission fiber.

It is noted that the optical amplifiers 304.1–304.6 may have wavelength dependent gain and noise profiles that can cause unequal performance across the channels 1-N. The above-mentioned multiple pre-emphases technique comprising the first and second pre-emphasis techniques performed at the transmitter end 302 and by the pre-emphasis device 314, respectively, may be employed to compensate for such unequal channel performance over an extended fiber transmission distance.

Specifically, the first pre-emphasis technique is employed to compensate for unequal channel performance occurring between the transmitter end 302 and the pre-emphasis device 314. As a result, each of the component channels 1-N at an output of the pre-emphasis device 314 has a designated OSNR value. Further, the second pre-emphasis technique is employed to compensate for unequal channel performance occurring between the pre-emphasis device 314 and the receiver end 306. As a result, each of the component channels 1-N at outputs of the receiver end 306 has a designated OSNR value.

In the illustrated embodiment, both designated and measured output power levels of the optical amplifiers 304.1–304.6 are employed to estimate the designated OSNR values for the optical transmission system. Further, during the estimation of the designated OSNR values, the optical amplifiers 304.1–304.6 are preferably operated under a constant gain control mode to simplify system provisioning and channel turn-up procedures.

The designated OSNR value "OSNR_D" of each of the channels 1-N is generally pre-determined in the design and is dependent on the channel power and the total power requirements. In the event the OSNR_D is not predetermined, it can be estimated using the following equation:

$$OSNR\_D = OSNR\_M + \min[Power\_D\_OA(I) - Power\_M\_OA(I)]$$

in which "OSNR_M" is the measured OSNR value of the channel in a particular pre-emphasis section of the transmission path, "Power_D_OA(I)" is the designated output power level of the $I^{th}$ optical amplifier in that pre-emphasis section, and "Power_M_OA(I)" is the measured output power level of the $I^{th}$ optical amplifier in that pre-emphasis section. It is noted that in the illustrated embodiment, the index "I" ranges from 1 to 3. Accordingly, the expression "min[Power_D_OA(I)–Power_M_OA(I)]" represents the minimum of the differences between the designated output power level and the measured output power level of the respective optical amplifiers in that pre-emphasis section.

Figure 4:
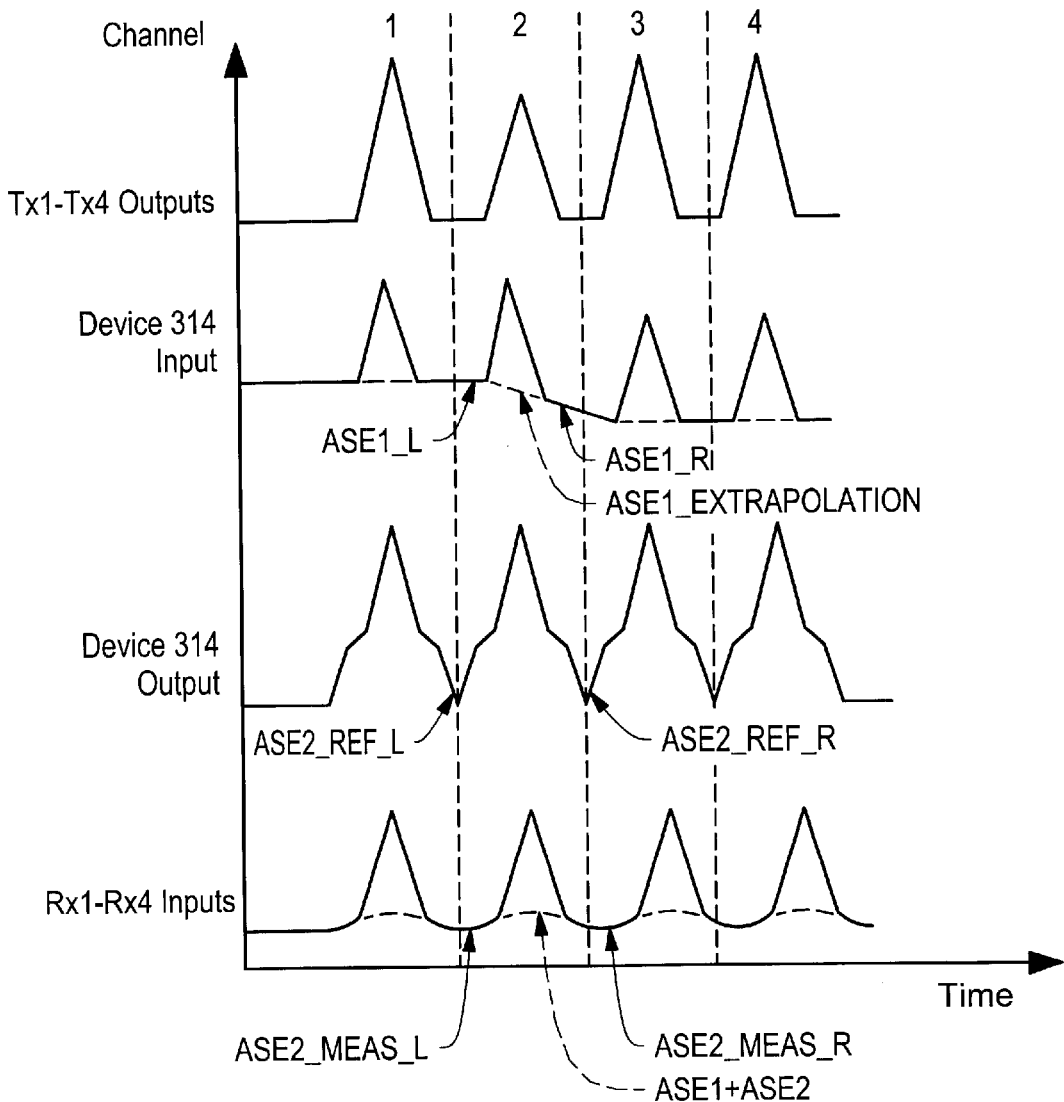
FIG. 4 is a diagram depicting exemplary optical waveforms at a transmitter end, a pre-emphasis device, and a receiver end of the DWDM optical transmission system of FIG. 3, the exemplary waveforms illustrating an OSNR estimation technique employing out-of-band ASE noise level measurements.

FIG. 4 depicts a diagram including exemplary waveforms at outputs of the optical transmitters Tx1–Tx4, at inputs and outputs of the pre-emphasis device 314, and at inputs of the optical receivers Rx1–Rx4 (see FIG. 3). The exemplary waveforms illustrate an OSNR estimation technique employing out-of-band ASE noise level measurements, which may be used in conjunction with the above-mentioned first and second pre-emphasis techniques.

Specifically, the diagram of FIG. 4 shows the exemplary waveforms of component channels 1–4 at the Tx1–Tx4 outputs having non-uniform optical power gains, and at the device 314 input. Because the optical amplifiers 304.1–304.3 may have wavelength dependent gain and noise profiles, the diagram of FIG. 4 shows a non-flat ASE noise floor across the component channels 1–4 at the device 314 input.

The first pre-emphasis technique is performed at the transmitter end 302 to estimate designated OSNR values at the pre-emphasis device 314. As described above, the designated OSNR value "OSNR1_D" of each of the channels 1–4 is estimated using equation (2). Accordingly, the output power levels "Power1_M_OA(I)" of the respective optical amplifiers 304.1–304.3 are measured by a measurement device such as an optical spectrum analyzer, while the output power levels "Power1_D_OA(I)" of the respective optical amplifiers 304.1–304.3 are designated to reduce the total power requirements of this first pre-emphasis section.

Further, the measured OSNR value "OSNR1_M" of each of the channels 1–4 is estimated by way of extrapolation. For example, to estimate the OSNR value of channel 2, the optical signal power level of channel 2 "Power1_2" for this first pre-emphasis section is measured. Next, out-of-band ASE noise levels at a left shoulder portion "ASE1_L" and at a right shoulder portion "ASE1_R" of the optical signal of channel 2 are measured. The measured OSNR value of channel 2 "OSNR1_M_2" for this first pre-emphasis section is then estimated using equation (1), in which the expression "0.5*(ASE1_L+ASE1_R)" represents the extrapolated in-band ASE1 noise level of channel 2. It is noted that the measured OSNR values of channels 1, 3, and 4 at the pre-emphasis device 314 may be estimated in a similar manner.

Accordingly, this first pre-emphasis technique is completed by adjusting the pre-emphasis attenuation or gain of the respective channels 1–4 by way of the VOAs 308.1–308.4 based on the measured OSNR1_M values of channels 1–4 to achieve the designated OSNR1_D values of channels 1–4 at the pre-emphasis device 314.

Next, the second pre-emphasis technique is performed at the pre-emphasis device 314 to estimate designated OSNR values at the receiver end 306. Specifically, the diagram of FIG. 4 shows the exemplary waveforms of component channels 1–4 at the device 314 output, and at the Rx1–Rx4 inputs. Because the out-of-band ASE noise "ASE1_L" and "ASE1_R" may be modified by dispersion components such as the optical de-multiplexor 316 and the optical multiplexor 320 included in the pre-emphasis device 314, conventional techniques generally cannot be employed to measure the OSNR values of the channels 1–4 at the receiver end 306.

Again, the designated OSNR value "OSNR2_D" of each of the channels 1–4 is estimated using equation (2). Accordingly, output power levels "Power2_N_OA(I)" of the respective optical amplifiers 304.4–304.6 are measured by an optical spectrum analyzer, while output power levels "Power2_D_OA(I)" of the respective optical amplifiers 304.4–304.6 are designated to reduce the total power requirements of this second pre-emphasis section.

Next, the measured OSNR value "OSNR2_M" of each of the channels 1–4 at the pre-emphasis device 314 is estimated. For example, to estimate the OSNR value of channel 2, out-of-band ASE reference noise levels at a left shoulder portion "ASE2_REF_L" and at a right shoulder portion "ASE2_REF_R" of the optical signal of channel 2 at the device 314 output are measured.

Specifically, the ASE2_REF_L and ASE2_REF_R noise levels may be located by searching for minimum ASE noise levels within predetermined wavelength ranges of the optical signal. For example, for 100 GHz channel spacing and a central channel wavelength of $\lambda_c$, a suitable predetermined wavelength range for ASE2_REF_L is $$[(\lambda_c-0.5)nm, (\lambda_c-0.3)nm], \quad (3)$$

and a suitable predetermined wavelength range for ASE2_REF_R is $[(\lambda_c+0.3)nm, (\lambda_c+0.5)nm]$. (4)

Next, out-of-band ASE noise levels at a left shoulder portion "ASE2_MEAS_L" and at a right shoulder portion "ASE2_MEAS_R" of the optical signal of channel 2 at the Rx1–Rx4 inputs are measured. Corresponding actual out-of-band ASE noise levels "ASE2_ACT_L" and "ASE2_ACT_R" for this second pre-emphasis section are then estimated using the following equations:

$$ASE2\_ACT\_L\_LINEAR=ASE2\_MEAS\_L\_LINEAR-ASE2\_REF\_L\_LINEAR \quad (5)$$

$$ASE2\_ACT\_R\_LINEAR=ASE2\_MEAS\_R\_LINEAR-ASE2\_REF\_R\_LINEAR. \quad (6)$$

It is noted that names of parameters in linear format include the "LINEAR" suffix, as shown in equations (5) and (6) (see also equations (7)–(11) below). Parameters that are not in linear format are in logarithmic format.

Next, an in-band ASE2 noise level of channel 2 for this second pre-emphasis section is calculated using the following equation:

$$ASE2\_ACT\_LINEAR=10\hat{\ }[0.5*(ASE2\_L\_2+ASE2\_R\_2)/10] \quad (7)$$

An actual in-band ASE1 noise of channel 2 for the first pre-emphasis section is then estimated based on the measured optical signal power level (Power1_2) and the measured OSNR value (OSNR1_M_2) using the following equation:

$$ASE1\_ACT=Power1\_2-OSNR1\_M\_2. \quad (8)$$

Next, equation (8) is converted into linear form as follows, $$ASE1\_ACT\_LINEAR=10\hat{\ }[0.5*(ASE1\_L\_2+ASE1\_R\_2)/10] \quad (9)$$

The total ASE noise level at the receiver end 306 of the DWDM optical transmission system 300 (see FIG. 3) for channel 2 is then calculated using the following equation:

$$ASE\_LINEAR=ASE1\_LINEAR+ASE2\_LINEAR, \quad (10)$$

in which "ASE1" and "ASE2" are determined using equations (7) and (9), as indicated above.

Next, the optical signal power level of channel 2 "Power2_2" for this second pre-emphasis section is measured. The total measured OSNR value at the receiver end 306 for channel 2 is then estimated using the following equation:

$$OSNR(TOTAL)\_M\_2=Power2\_2-10*LOG(ASE\_LINEAR) \quad (11a)$$

Alternatively, this value can be estimated through OSNR measurement using the following equation:

$$OSNR(TOTAL)\_M\_2=-10*LOG(1/OSNR1\_ACT\_2\_LINEAR+1/OSNR2\_ACT\_2\_LINEAR), \quad (11b)$$

in which OSNR1_ACT_2 and OSNR2_ACT_2 are the OSNR values at channel 2 from the first pre-emphasis section and from the second pre-emphasis section, respectively. It is noted that the total measured OSNR values of channels 1, 3, and 4 at the receiver end 306 may be estimated in a similar manner.

Accordingly, this second pre-emphasis technique is completed by adjusting the pre-emphasis attenuation or gain of the respective channels 1–4 by way of the VOAs 318.1–318.4 based on the measured OSNR(TOTAL)_M values of channels 1–4 to achieve the designated OSNR2_D values of channels 1–4 at the receiver end 306.

Figure 5:
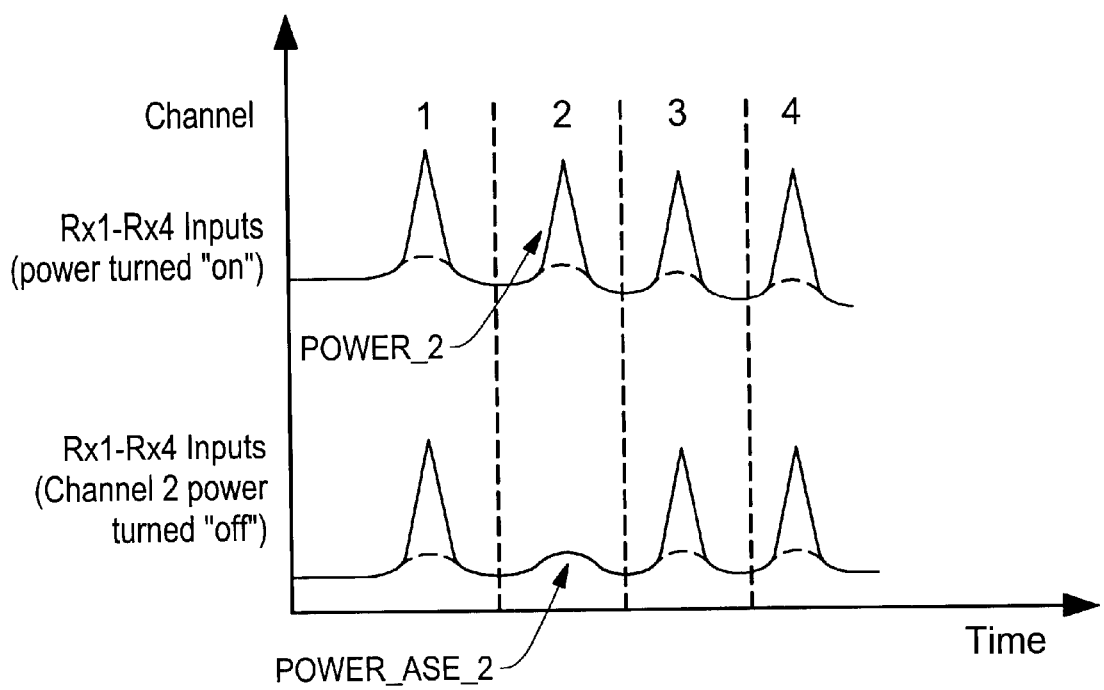
FIG. 5 is a diagram depicting exemplary optical waveforms at a receiver end of the DWDM optical transmission system of FIG. 3, the exemplary waveforms illustrating an OSNR measurement technique that includes alternately turning channel power "on" and "off"

FIG. 5 depicts a diagram including exemplary waveforms at the inputs of the optical receivers Rx1–Rx4 (see FIG. 3). The exemplary waveforms illustrate an OSNR measurement technique including alternately turning channel power "on" and "off", which may be used in conjunction with the above-described multiple pre-emphases technique comprising the first and second pre-emphasis techniques. Specifically, the diagram of FIG. 5 shows the exemplary waveforms of component channels 1–4 at the Rx1–Rx4 inputs with optical power for all channels turned-on, and with the optical power for channel 2 turned-off.

This OSNR measurement technique is based on the concept that once the total input power provided to each of the optical amplifiers 304.1–304.6 is set within a suitable range to maintain a desired gain, the ASE noise levels of the respective optical amplifiers are dependent only on those desired gains and are independent of both the individual channel power and the total channel power.

Accordingly, in order to measure the total OSNR value at the receiver end 306, the optical signal power levels of the channels 1–4 at the receiver end 306 are measured, and then the power levels of corresponding ASE noise of the channels 1–4 are measured after turning the optical signal power for the respective channels "off". For example, the diagram of FIG. 5 shows the optical spectrum of channel 2 with the optical signal power "Power_2" turned-on, and with Power_2 turned-off to reveal the corresponding ASE noise "Power_ASE_2". The OSNR(TOTAL)_M value for channel 2 can then be calculated using the following equation:

$$OSNR(TOTAL)\_M\_2=Power\_2-Power\_ASE\_2. \quad (12)$$

It is noted that this OSNR measurement can be performed using an optical spectrum analyzer. Further, this OSNR measurement technique may be employed with optical transmission systems that comprise Optical Add-Drop Nodes (OADNs), which generally complicate out-of-band ASE noise level measurements.

It is also noted that such OSNR measurements can be performed by monitoring channel powers at each amplifier input, such as by dithering the optical transmitters Tx1–TxN (see FIG. 3). For example, the optical transmitters Tx1–TxN may be dithered using dither signals with distinct frequencies or the same frequencies. Further, the dither frequencies may be high enough to avoid interference with the modulated optical signals and low enough to avoid cross-modulation of the optical amplifiers 304.1–304.6, which typically have low response bandwidths.

Moreover, at each of the optical amplifiers 304.1–304.6, the dither signal may be detected using a photo-detector and suitable digital signal processing. The detected dither signals may then be used to estimate the optical power of the channels 1-N. Next, the OSNR value for each channel "K" can be calculated using the following equation:

$$OSNR\_K=58+10*LOG[1/(E_I NF\_I/P\_in\_I\_K)], \quad (13)$$

in which "NF_I" is the Noise Figure (NF) at optical amplifier "I", and "P_in_I_K" is the optical input power of channel "K" at optical amplifier "I".

As described above, the multiple pre-emphases technique is completed by adjusting the pre-emphasis attenuation or gain of the respective channels 1-N based on the measured OSNR values (OSNR_M) to achieve the designated OSNR values (OSNR_D) of the channels 1-N at the end of each pre-emphasis section. Specifically, the OSNR values of the channels 1-N at each pre-emphasis section can be balanced by measuring the OSNR_M value at each channel to be pre-emphasized. Next, in the event the OSNR_M value is not within the range "OSNR_D+TOL", e.g., TOL=0.5 dB, the optical output power of the channel is adjusted according to the following equation:

$$ChannelPower\_Adj\ (dB) = OSNR\_M - OSNR\_D. \quad (14)$$

The channel optical output power is then adjusted until the OSNR_M is within the range "OSNR_D+TOL".

Figure 6:
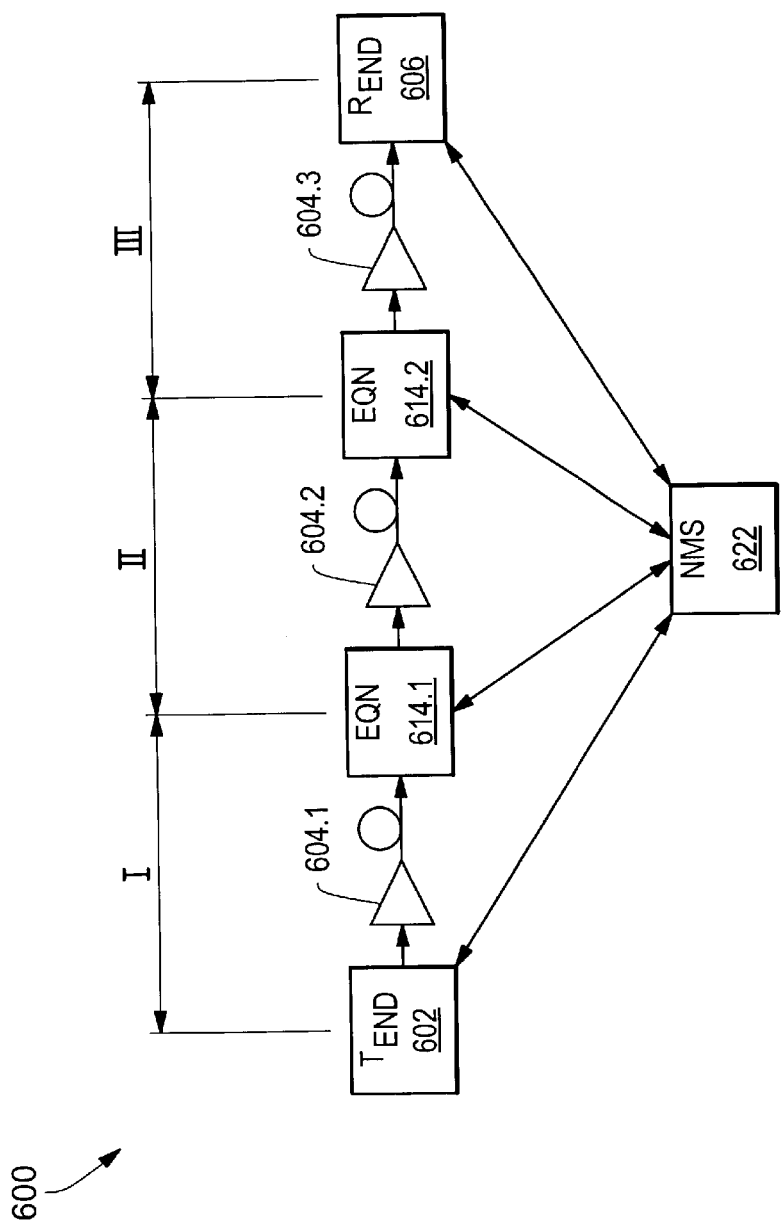
FIG. 6 is a block diagram depicting an alternative embodiment of the DWDM optical transmission system of FIG. 3 capable of performing an automatic multiple pre-emphases technique.

FIG. 6 depicts a block diagram of an alternative embodiment 600 of the DWDM optical transmission system 300 (see FIG. 3). The DWDM optical transmission system 600 is capable of automatically performing the above-described multiple pre-emphases technique. In the illustrated embodiment, the DWDM optical transmission system 600 includes a transmitter end 602, a receiver end 606, and a plurality of pre-emphasis devices 614.1–614.2 serially coupled between the transmitter and receiver ends 602 and 606. Further, at least one optical amplifier 604.1 is coupled between the transmitter end 602 and the pre-emphasis device 614.1 to form a pre-emphasis section I, at least one optical amplifier 604.2 is coupled between the pre-emphasis device 614.1 and the pre-emphasis device 614.2 to form a pre-emphasis section II, and at least one optical amplifier 604.3 is coupled between the pre-emphasis device 614.2 and the receiver end 606 to form a pre-emphasis section III.

It is noted that the pre-emphasis devices 614.1–614.2 are depicted as respective OEQNs. However, it should be understood that the pre-emphasis devices 614.1–614.2 may comprise any other suitable device capable of performing the multiple pre-emphases technique disclosed herein.

The DWDM optical transmission system 600 further includes a Network Management System (NMS) 622, which is configured to control the performance of the above-described multiple pre-emphases technique. Specifically, the NMS 622 includes at least one memory such as ROM and/or RAM for storing operating systems and application software modules, and at least one processor for executing applications for controlling the performance of three (3) pre-emphasis techniques. For example, the NMS 622 may control the three (3) pre-emphasis techniques for sequentially achieving designated OSNR values at each of the pre-emphasis sections I–III by suitably adjusting optical channel power levels at the pre-emphasis device 614.1, at the pre-emphasis device 614.2, or at the transmitter end 602.

It will further be appreciated by those of ordinary skill in the art that modifications to and variations of the above-described system and method may be made without departing from the inventive concepts disclosed herein. Accordingly, the invention should not be viewed as limited except as by the scope and spirit of the appended claims.

What is claimed is:

1. A method of compensating for unequal channel performance in a wavelength division multiplexed optical transmission system, comprising the steps of:
    providing a transmission path for carrying a multi-wavelength optical signal, the transmission path including a transmitter end and a receiver end, the multi-wavelength optical signal comprising a plurality of channels of information;
    transmitting the plurality of channels by respective optical transmitters at the transmitter end;
    performing a first pre-emphasis technique on the respective channels by a first pre-emphasis device coupled along the transmission path between the transmitter end and the receiver end;
    performing at least one second pre-emphasis technique on the respective channels by at least one second pre-emphasis device coupled along the transmission path between the first pre-emphasis device and the receiver end; and
    receiving and detecting the information carried by the plurality of channels by respective optical receivers at the receiver end,
    wherein the first pre-emphasis technique performed in the first performing step includes compensating for unequal channel performance along the transmission path between the transmitter end and the first pre-emphasis device,
    wherein the second pre-emphasis technique performed in the second performing step includes compensating for unequal channel performance along the transmission path between the second pre-emphasis device and the receiver end, and
    wherein the first pre-emphasis technique performed in the first performing step further includes receiving a first plurality of OSNR values (OSNR1_M) of the respective channels measured at the second pre-emphasis device, and adjusting pre-emphasis attenuation or gain of the respective channels based on the first plurality of measured OSNR values (OSNR1_M) to achieve a first plurality of designated OSNR values (OSNR1_D) of the respective channels at the second pre-emphasis device.

2. The method of claim 1 further including the step of amplifying the multi-wavelength optical signal by at least one optical amplifier coupled along the transmission path between the first pre-emphasis device and the second pre-emphasis device.

3. The method of claim 2 wherein the amplifying step includes operating the at least one optical amplifier under a constant gain control mode.

4. The method of claim 1 further including the step of measuring the first plurality of OSNR values of the respective channels by a first measurement device at the second pre-emphasis device.

5. The method of claim 1 wherein the steps of the first and second pre-emphasis techniques are performed under control of a network management system.

6. A method of compensating for unequal channel performance in a wavelength division multiplexed optical transmission system, comprising the steps of:
    providing a transmission path for carrying a multi-wavelength optical signal, the transmission path including a transmitter end and a receiver end, the multi-wavelength optical signal comprising a plurality of channels of information;
    transmitting the plurality of channels by respective optical transmitters at the transmitter end;
    performing a first pre-emphasis technique on the respective channels by a first pre-emphasis device coupled along the transmission path between the transmitter end and the receiver end;
    performing at least one second pre-emphasis technique on the respective channels by at least one second pre-emphasis device coupled along the transmission path between the first pre-emphasis device and the receiver end; and receiving and detecting the information carried by the plurality of channels by respective optical receivers at the receiver end, wherein the first pre-emphasis technique performed in the first performing step includes compensating for unequal channel performance along the transmission path between the transmitter end and the first pre-emphasis device, wherein the second pre-emphasis technique performed in the second performing step includes compensating for unequal channel performance along the transmission path between the second pre-emphasis device and the receiver end, and wherein the second pre-emphasis technique performed in the second performing step further includes receiving a second plurality of OSNR values (OSNR2_M) of the respective channels measured at the receiver end, and adjusting pre-emphasis attenuation or gain of the respective channels based on the second plurality of measured OSNR values (OSNR2_M) to achieve a second plurality of designated OSNR values (OSNR2_D) of the respective channels at the receiver end.

7. The method of claim 6 further including the step of amplifying the multi-wavelength optical signal by at least one optical amplifier coupled along the transmission path between the second pre-emphasis device and the receiver end.

8. The method of claim 7 wherein the amplifying step includes operating the at least one optical amplifier under a constant gain control mode.

9. The method of claim 6 further including the step of measuring the second plurality of OSNR values (OSNR2_M) of the respective channels by a second measurement device at the receiver end.

10. The method of claim 9 wherein the adjusting step of the second pre-emphasis technique includes in the event the OSNR2_M value of one of the respective channels in not within a range OSNR2_D+TOL, adjusting the pre-emphasis attenuation or gain of the respective channel at the second pre-emphasis device by an amount OSNR2_ADJ defined by

OSNR2_ADJ=OSNR2_M−OSNR2_D, and repeating the measuring and adjusting steps of the second pre-emphasis technique until the OSNR2_M value of the respective channel is within the range OSNR2_D+TOL.

11. The method of claim 10 wherein the adjusting step of the second pre-emphasis technique includes adjusting the pre-emphasis attenuation or gain of the respective channel using at least one dispersion component or at least one channel power control element.

12. The method of claim 10 wherein the measuring step of the second pre-emphasis technique includes measuring out-of-band ASE noise of the respective channel, and using the measured out-of-band ASE noise to estimate the OSNR2_M value of the respective channel.

13. The method of claim 10 wherein the measuring step of the second pre-emphasis technique includes turning-off optical power of the respective channel, measuring in-band ASE noise of the respective channel, and using the measured in-band ASE noise to estimate the OSNR2_M value of the respective channel.

14. The method of claim 10 wherein the measuring step of the second pre-emphasis technique includes monitoring respective channel powers at each amplifier input by applying a dither signal to the respective channel, detecting the applied dither signal at inputs of respective optical amplifiers coupled along the transmission path between the second pre-emphasis device and the receiver end, using the detected dither signals to estimate optical power of the respective channel, and using the estimated optical power to estimate the OSNR2_M value of the respective channel.

15. A wavelength division multiplexed optical transmission system, comprising:

a transmission path configured to carry a multi-wavelength optical signal, the transmission path including a transmitter end and a receiver end, the multi-wavelength optical signal comprising a plurality of channels of information;

a plurality of optical transmitters at the transmitter end configured to transmit the respective channels;

a first pre-emphasis device coupled along the transmission path between the transmitter end and the receiver end and configured to perform a first pre-emphasis technique on the respective channels;

at least one second pre-emphasis device coupled along the transmission path between the first pre-emphasis device and the receiver end and configured to perform a second pre-emphasis technique on the respective channels; and a plurality of optical receivers at the receiver end configured to receive and detect the information carried by the respective channels, wherein the first and second pre-emphasis techniques are performed to compensate for unequal channel performance along the transmission path, and wherein the first pre-emphasis device performing the first pre-emphasis technique is configured to receive a first plurality of OSNR values of the respective channels measured at the second pre-emphasis device, and to adjust pre-emphasis attenuation or gain of the respective channels based on the first plurality of measured OSNR values to achieve a first plurality of designated OSNR values of the respective channels at the second pre-emphasis device.

16. The wavelength division multiplexed optical transmission system of claim 15 further including a first measurement device configured to measure the first plurality of OSNR values of the respective channels at the second pre-emphasis device.

17. The wavelength division multiplexed optical transmission system of claim 15 further including at least one optical amplifier coupled along the transmission path between the first pre-emphasis device and the second pre-emphasis device and configured to amplify the multi-wavelength optical signal.

18. The wavelength division multiplexed optical transmission system of claim 15 wherein the first pre-emphasis device comprises at least one variable optical attenuator.

19. A wavelength division multiplexed optical transmission system, comprising:

a transmission path configured to carry a multi-wavelength optical signal, the transmission path including a transmitter end and a receiver end, the multi-wavelength optical signal comprising a plurality of channels of information;

a plurality of optical transmitters at the transmitter end configured to transmit the respective channels;

a first pre-emphasis device coupled along the transmission path between the transmitter end and the receiver end and configured to perform a first pre-emphasis technique on the respective channels;

at least one second pre-emphasis device coupled along the transmission path between the first pre-emphasis device and the receiver end and configured to perform a second pre-emphasis technique on the respective channels; and a plurality of optical receivers at the receiver end configured to receive and detect the information carried by the respective channels, wherein the first and second pre-emphasis techniques are performed to compensate for unequal channel performance along the transmission path, and wherein the second pre-emphasis device performing the second pre-emphasis technique is configured to receive a second plurality of OSNR values of the respective channels measured at the receiver end, and to adjust pre-emphasis attenuation or gain of the respective channels based on the second plurality of measured OSNR values to achieve a second plurality of designated OSNR values of the respective channels at the receiver end.

20. The wavelength division multiplexed optical transmission system of claim 19 further including a second measurement device configured to measure the second plurality of OSNR values of the respective channels at the receiver end.

21. The wavelength division multiplexed optical transmission system of claim 19 further including at least one optical amplifier coupled along the transmission path between the second pre-emphasis device and the receiver end and configured to amplify the multi-wavelength optical signal.

22. The wavelength division multiplexed optical transmission system of claim 19 wherein the second pre-emphasis device comprises an optical equalization node.

23. The wavelength division multiplexed optical transmission system of claim 19 wherein the second pre-emphasis device comprises a dynamical gain flatness filter.

* * * * *

UNITED STATES PATENT AND TRADEMARK OFFICE
CERTIFICATE OF CORRECTION

PATENT NO. : 6,456,409 B2
DATED : September 24, 2002
INVENTOR(S) : Jianying Zhou et al.

It is certified that error appears in the above-identified patent and that said Letters Patent is hereby corrected as shown below:

<u>Drawings,</u>
Please replace new FIG. 2 as follows:

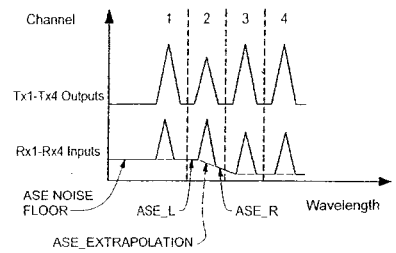

*FIG. 2*
PRIOR ART

Please replace new FIG. 4 as follows:

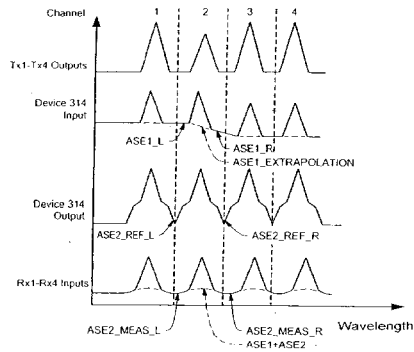

*FIG. 4*

Please replace new FIG. 5 as follows:

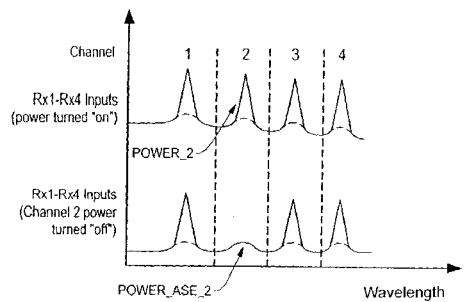

*FIG. 5*

UNITED STATES PATENT AND TRADEMARK OFFICE
CERTIFICATE OF CORRECTION

PATENT NO.   : 6,456,409 B2
DATED        : September 24, 2002
INVENTOR(S)  : Jianying Zhou et al.

It is certified that error appears in the above-identified patent and that said Letters Patent is hereby corrected as shown below:

Column 7,
Line 33, replace equation (2) as follows:
-- $OSNR\_D = OSNR\_M + \min[Power\_D\_OA(I) - Power\_M\_OA(I)]$,   (2) --;

Column 8,
Line 43, ""Power2_N_OA(I)"" should read -- "Power2_M_OA(I)" --;

Column 9,
Line 25, replace equation (7) as follows:
-- $ASE2\_ACT\_LINEAR = 10^{\wedge}[0.5 * (ASE\_L\_2 + ASE\_R\_2)/10]$   (7) --;
Line 40, replace equation (9) as follows:
-- $ASE2\_ACT\_LINEAR = 10^{\wedge}[0.5 * (ASE\_L\_2 + ASE\_R\_2)/10]$   (9) --;
Line 57, replace equation (11a) as follows:
-- $OSNR\ (TOTAL)\_M\_2 = Power2\_2 - 10*LOG(ASE\_LINEAR)$    (11a) --;

Column 10,
Line 66, replace equation (13) as follows:
-- $OSNR\_K = 58 + 10*LOG[1/(\Sigma_I NF\_I/P\_in\_I\_K)]$,    (13) --;

Column 12,
Lines 18-19, "path between the transmitter end and the first pre-emphasis device," should read -- path between the first pre-emphasis device and the second pre-emphasis device, --;

UNITED STATES PATENT AND TRADEMARK OFFICE
CERTIFICATE OF CORRECTION

PATENT NO. : 6,456,409 B2
DATED : September 24, 2002
INVENTOR(S) : Jianying Zhou et al.

It is certified that error appears in the above-identified patent and that said Letters Patent is hereby corrected as shown below:

Column 13,
Lines 10-11, "path between the transmitter end and the first pre-emphasis device," should read -- path between the first pre-emphasis device and the second pre-emphasis device, --;

Signed and Sealed this

Fourteenth Day of September, 2004

JON W. DUDAS

UNITED STATES PATENT AND TRADEMARK OFFICE
CERTIFICATE OF CORRECTION

PATENT NO.     : 6,456,409 B2
DATED          : September 24, 2002
INVENTOR(S)    : Jianying Zhou et al.

It is certified that error appears in the above-identified patent and that said Letters Patent is hereby corrected as shown below:

Column 11,
Line 10, ""OSNR_D+TOL"" should read -- "OSNR_D ± TOL" --; and

Column 13,
Line 41, "OSNR2_D+TOL," should read -- OSNR2_D ± TOL, --.
Lines 52-53, "OSNR2_D+TOL" should read -- OSNR2_D ± TOL --.

Signed and Sealed this

Twenty-third Day of August, 2005

JON W. DUDAS
*Director of the United States Patent and Trademark Office*